Feb. 10, 1942.  W. P. VOTH  2,272,231
RETREADING VULCANIZER
Filed Oct. 18, 1939
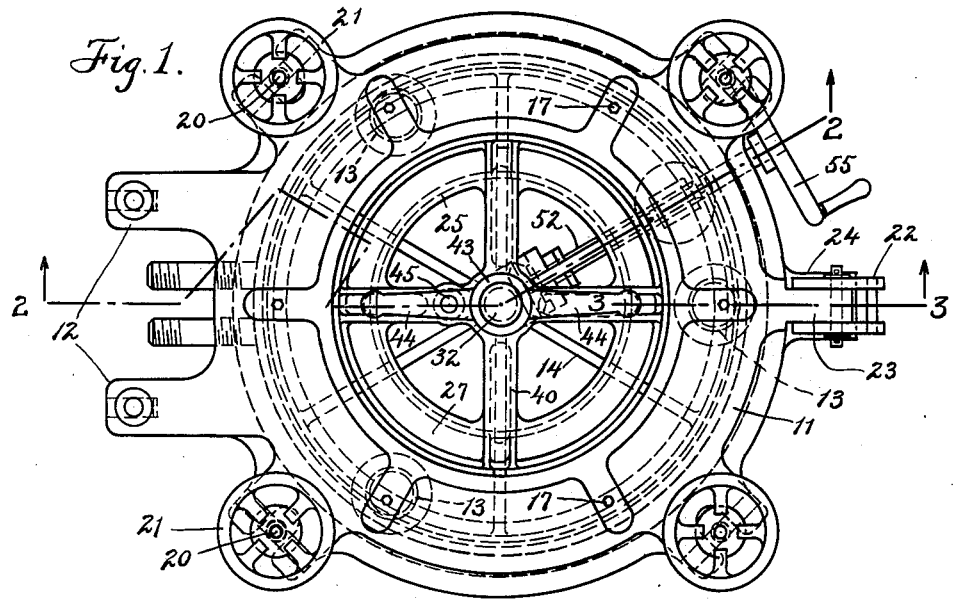
Inventor,
W. P. Voth,
By Robert M. Pierson,
Attorney Patented Feb. 10, 1942

2,272,231

UNITED STATES PATENT OFFICE 2,272,231

RETREADING VULCANIZER

Walter P. Voth, Coventry Township, Summit County, Ohio, assignor to The Akron Standard Mold Company, Akron, Ohio, a corporation of Ohio Application October 18, 1939, Serial No. 299,988

8 Claims. (Cl. 18—18)

This invention relates to pneumatic-tire retreading vulcanizers having confining members for holding the tire side walls, or portions thereof such as the beads, against lateral separation under internal pressure, in order to provide radial tread pressure against the mold. A specific example is disclosed in patent to C. B. Hudson, No. 1,836,850, of December 15, 1931, having a tire-mounting rim of adjustable width supported concentrically with the vulcanizing mold. Such a rim, so mounted, may be adjusted to provide different bead spacings, and it centralizes the tire radially in the mold so as to reduce the liability to formation of thick and thin spots in the tread rubber which produce an unbalanced wheel. But the rim of said patent is axially floating and hence does not centralize the tire axially of the mold, the mold itself having side wings relied on for that purpose, as in full retreading. It is difficult to perform accurate recapping in such a mold, when the capping matrix laterally confines only the flanks of the new rubber.

The principal object of my invention is to provide a full-circle tire-tread vulcanizer especially adapted for recapping work, although not wholly confined thereto, said vulcanizer having improved adjustable means for axially centralizing the work, and preferably also radially centralizing it, as by means of an adjustable base rim. Further objects are to provide improved means for concurrently adjusting both sides of the centralizing means, for different tire widths and preferably for different bead spacings, to loosen or eject or strip the vulcanized tire from the side of the mold in which it sticks, and to facilitate the interchange of rims of different sizes in the apparatus.

Of the accompanying drawing,

Fig. 1 is a plan view showing a preferred form of my invention.

Fig. 2 is a vertical section approximately on the line 2—2 of Fig. 1.

Fig. 3 is a detail vertical section through the mold breaker, on the line 3—3 of Fig. 1.

Fig. 4 is a partial vertical section showing a rim-adjusting gauge usable with the apparatus, applied to the lower mold member.

In the drawing, 10, 11 are lower and upper annular heater members or platens of a horizontal hinged vulcanizer, cast with steam jackets 10ª, 11ª and rearwardly connected by a hinge 12 having a suitable adjustment for accommodating tires of different widths. The lower platen 10 is supported from the floor by legs 13 and is cast with a spider 14 having arms supporting a central hub 15. The platens carry respective tread mold or matrix sections 16 suitably seated thereon, detachably secured by screws 17 and adapted to be interchanged with ones of a different size for accommodating different tread diameters and widths. The matrix may be used with or without a spacer ring 18, suitably secured upon the lower matrix member and adapted to be supplied in different thicknesses as is customary.

The vulcanizer halves are held in closed position against the work by the usual series of circumferentially spaced clamping bolts, each consisting of a screw stem 20 pivoted between a pair of lugs on the lower platen, to swing into and out of operative position, and a hand nut 21 to engage a complemental pair of lugs on the upper platen. At the front of the vulcanizer, opposite to the hinge 12, is mounted a mold breaker consisting of a double cam lever 22 pivoted on a lug 23 upon the upper platen and adapted to engage a complemental lug 24 upon the lower platen.

25 is a tire rim of the type disclosed in the aforesaid Hudson patent, comprising lower and upper sections 26, 27 composed of respective cylindrical base members 28, 29 telescoping on each other, for laterally and radially confining the bases of the tire casing beads and air bag, and integral flange plates 30 whose inner portions engage the sides of the beads, having extension wings or annular side pressure members 31 to confine the adjacent radially inner tire sidewall portions, nearly out to the middle of the tire sides.

According to this invention, the rim sections 26, 27 are mounted for equal and opposite axial movement to adjust them for different bead spacing while maintaining the tire axially centralized with respect to the thread-molding matrix, and to that end, they are centrally carried by a vertical stem 32 which is mounted to turn on an anti-friction bearing 33 in the hub 15 of the supporting spider 14 and is formed with respective right and left screw threads 34, 35 engaging complementally threaded nut portions 36, 37, of which 37 is a separate nut in hubs 38, 39 connected by arms 40 with the respective lower and upper rim members 26, 27. The lower screw 34 and its nut portion are of larger diameter than the upper screw 35 and the latter's nut to facilitate removal of the lower rim section over the upper screw after removing the upper rim section, in effecting a change of rim diameter to suit the particular tire. The upper nut 37 is made separate from the hub 39 to act as a rim-section carrier permitting an initial setting of said upper nut by rotative adjustment with respect to the lower nut 36, and the two are formed with interfitting complemental cone portions 41, 42. The upper screw 35 passes loosely through the hub 39, and the latter is adapted to be fastened upon the carrier nut 37 by means of an upper clamping nut 43 engaging the hub 39 and formed with a pair of handle bars 44, to hold the rim closed upon the tire.

To hold the carrier nut 37 and the rim sections 26, 27 from turning when the screw shaft is rotated, there is provided a guiding dowel rod or pin 45 having a flange 46 resting on an arm 47 of the nut 37 and passing through alined apertures 48, 49, 50, 51 in the respective rim sections, in the arm of nut 37 and in the lower spider hub 15. For turning the screw shaft 32 from the front of the apparatus, there is provided a horizontal shaft 52 mounted in suitable inner and outer bearings 53, 54 on the spider 14, said shaft having a hand wheel 55 at its outer end and being connected at its inner end with the screw shaft 32 by means of a pair of bevel gears 56, 57 on the respective shafts.

Any suitable gauge or index may be provided to assist in determining the proper rim width setting for a particular tire, together with a suitable chart having a table or tables of tire sizes, corresponding matrix numbers or sizes and rim adjustments corresponding to the gauge markings. I prefer to employ the T-shaped metal gauge 58 shown in Fig. 4, having a stem 59 adapted to be laid horizontally edgewise against the upper side of the matrix 16 of the lower press platen 10 of the open heater, or against the upper side of a spacer ring 18 thereon, and a vertical cross bar or head 60 having a horizontal centerline mark 61 thereon, adapted to be registered with a circumferential centering groove 62 marked on the outer periphery of the base flange 28 of the lower rim section 26. The gauge is also marked on opposite faces with sets of graduations 63, 64, etc. corresponding respectively to the matrix ring thickness without a spacer and with spacers of different thickness. Each set of graduations has a predetermined center-line mark.

In the operation of adjusting the tire rim and loading the mold by the use of this invention, the mold being in the open position, the top rim section 27 and the guide rod 45 are removed. The gauge 58 is then laid edgewise with its stem on the lower matrix 16 or the spacer 18 and the bottom rim section 26 is raised or lowered by turning the hand wheel 55, the rim section being manually held against rotation, until the marking groove 62 thereon registers with the gauge center line 61 for the selected group of graduations. This establishes the rim center or datum plane from which width adjustments are made, with reference to the central mold plane with or without the presence of a spacer ring of selected thickness. The carrying nut 37 for the top rim section is then turned down as far as possible, with its guide rod hole 50 in line with the hole 49 below it, and the guide pin 45 is replaced. Reference is then made to the chart previously referred to, for the proper rim width for the particular tire, and the rim-operating hand wheel 55 is turned until the center line 62 on the lower rim section corresponds to one of the divisions of the scale markings 63, 64, etc., recommended by the chart. The carrying nut 37 will automatically be moved equally in the opposite direction. The prepared, raw-treaded tire with its contained air bag (not inflated) is then placed in the lower heater platen 10 and on the lower rim section 26, the upper platen and mold section are then closed upon the lower one and upon the work and tightened by means of the clamping bolts and nuts 20, 21, the top rim section 27 is replaced on the carrying nut 37 to confine the tire base, the rim nut 43 is screwed down tight, the tire bag is inflated to curing pressure and vulcanization is proceeded with. After the cure is complete, the tire is deflated, the rim and the mold are opened and the work is removed by an obvious reversal of the mold charging and closing operations.

A preferred feature of my invention consists in arranging its elements so that one of the rim sections may be used to loosen or eject the finished work from the corresponding mold sections in which it tends to stick when the mold is opened, through inter-engagement of mold projections and anti-skid design of the tire tread. This section in a horizontal mold is generally the lower one in the heater platen 10. Let it be assumed that the illustrated position of the rim members 26, 27 pertains to the narrowest tire for which the mold is intended, using a spacer ring 18. At the normal rim adjustment for such a tire, it will be noted that the rim hubs and their nuts 36, 37 are considerably spaced away from the inner ends of the screws 34, 35. After vulcanizing a retread, the upper heater platen 11 is opened away from the lower one and the top rim section 27 is removed, leaving the nut 37 in place to retain the relative setting of the two rim sections and leaving the rod 45 to prevent turning of said nut and the lower rim section. On turning the screw shaft 32 with the hand wheel 55 to raise rim section 26 from its normal position, the tire is thereby loosened from the lower matrix member, easing its further removal, or it may be completely stripped if the scope of upward rim-section movement is sufficient. The normal adjustment may then be restored for the next retread.

It will be understood that the matrix shape could be varied to conform to other types of retreading and that the described embodiment could otherwise be variously modified within the scope of the invention as defined in the claims.

I claim:

1. A retreading vulcanizer comprising a tread mold, two tire-engaging side pressure members, one of said members having a hub provided with a thread, a threaded carrier nut, the other of said members having a hub mounted on said threaded carrier nut, and a central rotary shaft having oppositely disposed threads cooperating with the threads of said first-named hub and the threads of said carrier nut for equally and oppositely adjusting said pressure members.

2. A vulcanizer according to claim 1 in which the carrier nut is rotatively adjustable on the central shaft to determine its initial axial spacing from the other member.

3. A retreading vulcanizer comprising lower and upper heater platens having respective tread mold members, a central shaft bearing on the lower member, a central vertical rotary shaft in said bearing having right and left hand threads, a nut threadingly engaging said shaft, lower and upper tire-side engaging members, one of said members mounted loosely on said nut, the other of said members and the nut having right and left hand threads engaging the respective shaft threads for oppositely adjusting said members when the shaft is rotated, and means normally preventing rotation of said members.

4. A vulcanizer according to claim 3, in which the nut is rotatively adjustable on the central shaft for initial axial setting independently of the upper platen member, and a vertical stationary guide rod to normally prevent rotation of the platen members.

5. A retreading vulcanizer comprising a tread mold, a tire base rim composed of sections telescoping on each other to determine the rim width, a threaded carrier nut carrying the upper section, a threaded hub in the lower section, a central rotary shaft having one end thereof mounted in a fixed bearing, and having right and left hand threads engaging said nut and said hub respectively for moving said sections in opposite directions whenever the shaft is rotated.

6. A vulcanizer according to claim 5 in which the portion of the shaft adjacent to the bearing has a larger diameter than that portion adjacent the upper section to permit the removal of rim sections over the smaller thread in changing rims.

7. A tire retreading vulcanizer comprising a support, a tread mold, a pair of adjustable tire-side confining members, a shaft having right and left hand threads and carried by said support and positioned axially of said mold, one of said members being in threaded engagement with one of the threads of the shaft, a nut in threaded engagement with the shaft, the other of said members being loosely mounted on said nut, said members and nut having aligned openings therein, a rod extending through said openings and slidably engaging said support for holding the members and nut against rotation, and a removable clamping nut engaging the other of the threads on said shaft for holding said other member against said first-mentioned nut.

8. In a method of tire retreading, the steps which comprise initially setting one of a pair of tire base rim sections with reference to a predetermined middle plane of a mold part in which the tire is intended to be vulcanized, correspondingly and simultaneously setting a support for the other rim section equally and oppositely with respect to said middle plane in accordance with the width of the tire to be retreaded, mounting a raw-treaded tire in the mold, positioning the other rim section on the support, locking it thereto and then vulcanizing the tread in the mold.

WALTER P. VOTH.